Sept. 14, 1943.　　　A. G. DENBIN　　　2,329,340
TROLLEY CONDUCTOR SUPPORT
Filed July 28, 1939　　　2 Sheets-Sheet 1
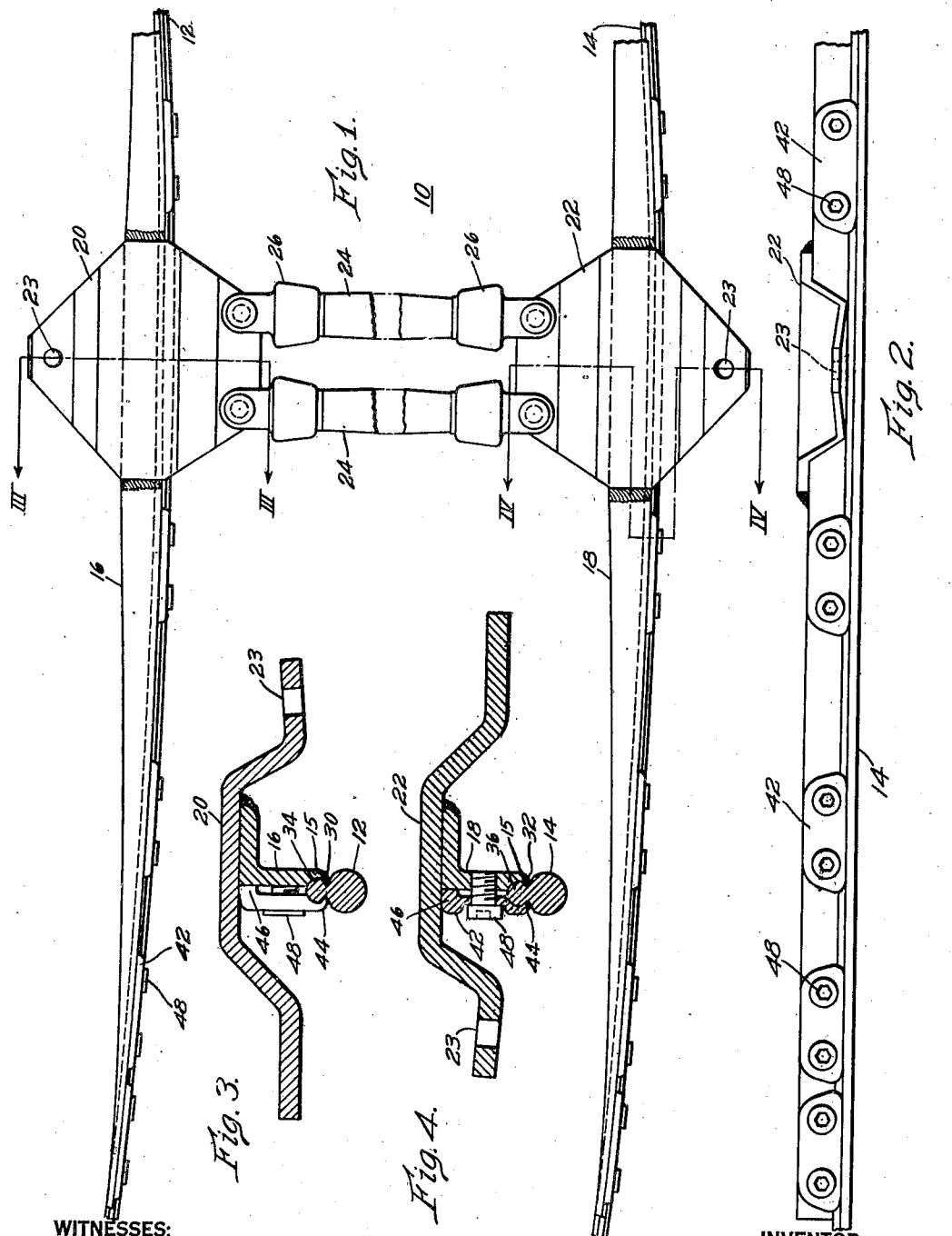
WITNESSES:
C. J. Weller.
F. V. Giolma
INVENTOR
Adolph G. Denbin
BY
M. Crawford
ATTORNEY

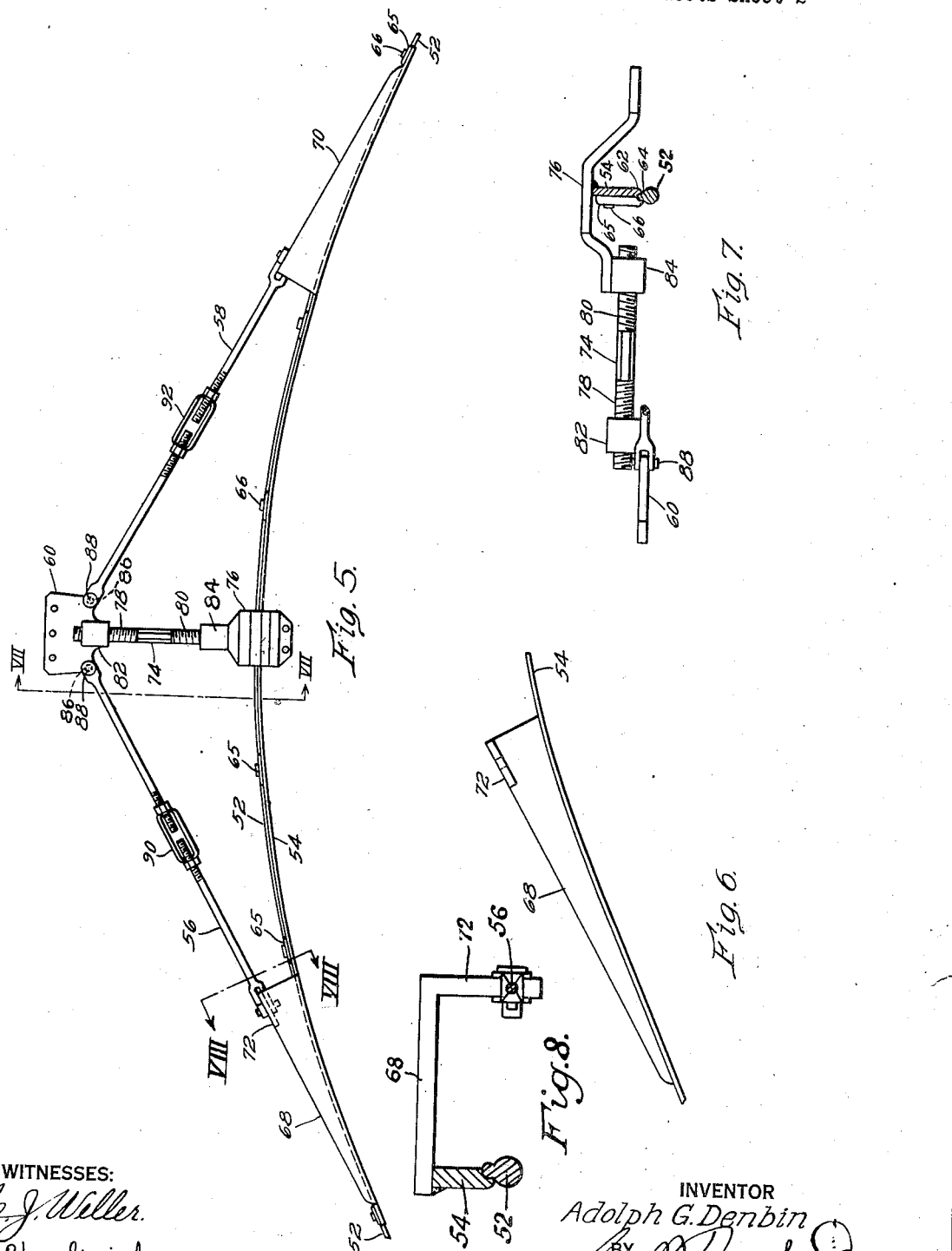
Sept. 14, 1943.  A. G. DENBIN  2,329,340
TROLLEY CONDUCTOR SUPPORT
Filed July 28, 1939  2 Sheets-Sheet 2
WITNESSES:
INVENTOR
Adolph G. Denbin
BY
ATTORNEY Patented Sept. 14, 1943

2,329,340

UNITED STATES PATENT OFFICE 2,329,340

TROLLEY CONDUCTOR SUPPORT

Adolph G. Denbin, Baltimore, Md.

Application July 28, 1939, Serial No. 286,985

31 Claims. (Cl. 191—40)

My invention relates, generally, to trolley conductor supports, and it has reference, in particular, to curve constructions and curved segments for use in overhead trolley systems.

The object of my invention, generally stated, is to provide a simple and efficient curve construction for overhead trolley systems.

More specifically, it is an object of my invention to provide for continuously supporting an overhead trolley wire, or a pair of trolley wires, at a curve for uninterrupted engagement by a current collector or a pair of current collectors, as the case may be.

Another object of my invention is to provide an adjustable curved support member or segment which may be readily adapted to curvatures of different radii for supporting a trolley wire at a curve.

A further object of my invention is to provide a readily adaptable support for a grooved trolley wire for supporting the trolley wire in a smooth curve for continuous engagement with a current collector.

Still another object of my invention is to provide a relatively flexible support for a trolley wire at a curve having suitable means for maintaining the proper tension in the trolley wire without distorting the support from the desired curvature.

Another object of my invention is to provide a support for a trolley wire which is of simple construction, inexpensive to manufacture, and which may be readily manufactured, installed and maintained.

In practicing my invention, a trolley wire may be supported at a curve by an elongated curved segment member which is provided with means adjacent the lower edge thereof for so positioning the wire that it may be uninterruptedly engaged by a current collector. The body of the curved segment member may be curved laterally to suit the particular situation, and suitable clamping means may be provided for detachably securing the trolley wire along the lower edge in fixed relation to the segment member. Suitable means also may be provided for positioning the curved segment member in the trolley system and maintaining the desired tension in the trolley wire with which it is used. Where the curve extends through a relatively large number of degrees suitable means may be provided for reinforcing the segment member and relieving it of some of the stresses imposed by the tension of the trolley wire. By making provision for using different reinforcing means or by providing for adjustment of the means, the segment may be adjusted to different curvatures.

In this manner, a curved construction may be provided without requiring the use of numerous pull-offs and approach members which will provide a smooth, continuous path for a current collector, thus eliminating the undesirable wear and noise occasioned by the passage of the current collector from the trolley wire to the approach members, and vice versa, in the usual type of overhead curve construction.

For a more complete understanding of the nature and scope of my invention, reference may be had to the following detailed description, which may be taken in connection with the accompanying drawings, in which:

Figure 1 is a partial plan view of one embodiment of the invention;

Fig. 2 is a side elevational view of the embodiment illustrated in Fig. 1;

Fig. 3 is a sectional view along the line III—III of Fig. 1;

Fig. 4 is a sectional view along the line IV—IV of Fig. 1;

Fig. 5 is a plan view of another embodiment of the invention;

Fig. 6 is an enlarged bottom view of the end member of the embodiment shown in Fig. 5;

Fig. 7 is an enlarged sectional view along the line VII—VII of Fig. 5; and

Fig. 8 is an enlarged sectional view along the line VIII—VIII of Fig. 5.

Referring particularly to Figure 1 of the drawings, the reference numeral 10 denotes, generally, a substantially self-sustaining curve construction for supporting the trolley wires 12 and 14 at a curve in an overhead trolley system.

The trolley wires 12 and 14, which may be of any suitable nature, being, for example, provided in a well known manner with lateral grooves 15, such as shown in Figs. 3 and 4, may be supported in the overhead system in spaced relation, by the elongated curved segment members 16 and 18. The segment members may be provided with support means such as the plates 20 and 22, respectively, to which suitable means (not shown) may be attached for positioning them in the overhead system. Since the segment members are substantially symmetrical with respect to the plates, only one end of the members is shown, so as to illustrate the invention more clearly.

Referring particularly to Figs. 2, 3 and 4 of the drawings, it will be observed that the plates 20 and 22 may be suitably formed, having arched central portions which may be secured to the curved segment members in any suitable manner, such as by welding. The end portions of the plates may be slightly depressed so as to bring the points of attachment thereto more nearly into the horizontal plane of the trolley wire. The outer portion thereof may be provided with eyes 23 for securing pull-offs or the like thereto, and may be bent upwardly at a slight angle to the horizontal so as to permit a pull-off attached thereto to apply a direct pull thereto and yet apply a downward pull on the pole or other support to which it is attached, so as to reduce the strain on the support. Suitable means, such as the insulating members 24, which may be of a well-known type, having end members 26 for securing them to the plates 20 and 22, may be provided for positioning the segment members in the desired spaced relation relative to each other.

The curved segment members 16 and 18 may be of any desired construction, comprising for example suitable lengths of structural angle sections, such as shown in Figs. 3 and 4. With a view to imparting a limited degree of resiliency to the curved segment members, so as to cushion the effects of any impacts on the trolley wires in the vicinity of the curve construction and permit the segment members to adjust themselves to the proper degree of curvature at the particular location where used, the horizontal leg portions thereof may be cut away towards the ends so as to produce a gradual taper thereof, thus allowing a flexing of the end portions. This permits more readily the forming of the segment members to the desired curvature, as well as adding to the resiliency of these members.

In order to support the trolley wires 12 and 14 throughout the curve, and provide for the uninterrupted engagement therewith of current collectors, the trolley wires 12 and 14 may be so secured to the outer edges of the segment members that the surfaces thereof engaged by the current collectors are clear of the segment members. For example, suitable wire-positioning means may be provided on the outer face of the segment members, such as the lip portions 30 and 32, which may be provided by machining grooves 34 and 36 along the outer faces of the curved segments adjacent the lower edges thereof. The trolley wires 12 and 14 may then be positioned against the outer curved faces of the segment members with the lip portions 30 and 32 in the grooves 15 of the trolley wires. For the purpose of securing the trolley wires 12 and 14 to the curved segments 16 and 18, suitable means, such for example, as the clamp members 42 may be provided, having lip portions 44 at one end for engaging the groove 15 in the trolley wire, and projecting fulcrum portions 46 at the other end for bearing against the vertical leg of the curved segment. Means, such as the hollow hexagonal screw members 48 threaded into the segment members, may be provided for drawing the clamp members 42 into engagement with the trolley wires and securing them in fixed relation to the curved segment members.

Referring to Fig. 5, the reference numeral 50 denotes generally another embodiment of the invention which may be advantageously used for supporting a trolley wire 52 at a location where the angle of curvature is relatively large. Under such circumstances it will be understood that the pull exerted by the trolley wire 52 may be considerable and the tendency thereof to deform the curved segment from the desired curvature may be great.

In order to permit the use of a relatively light and flexible body member 54 for supporting the trolley wire 52 in the desired curve, suitable reinforcing means may be provided for relieving the body member 54 of the pull of the trolley wire. For example, means such as the tangentially disposed tension members 56 and 58 may be provided, which may be connected at one end of the body member 54 adjacent the ends thereof, and at the other end to a pull-off plate 60 to which suitable pull-off means (not shown) may be attached for transmitting the pull of the trolley wire to the plate 60 and maintaining the proper tension in the trolley wire. In this manner the body member 54 may be relieved of at least a large part of the pull of the trolley wire.

The body member 54 of the segment member may for example, comprise a relatively light bar or strap member, which may, in a manner similar to that described in connection with the embodiment of the invention illustrated in Figs. 1 through 4, be provided with a lip portion 62 for engaging the groove 64 in one side of the trolley wire to position it for uninterrupted engagement by a current collector. Suitable clamp members 65 may be provided at spaced intervals along the body member 54, having screws 66, for securing the trolley wire in fixed relation to the body member.

Referring particularly to Figs. 5, 6, 7 and 8, it may be seen that means, such as the end members 68 and 70, may be utilized for securing the tension members 56 and 58 to the body member 54. In one form the end members may comprise plate members which may be secured to the upper edges of body member 54 adjacent the ends in any suitable manner, such as by welding. Depending ear portions 72 may be provided in spaced relation to the body member 54 for attaching the tension members thereto so as to exert a pull in the plane of the trolley wire, and provide clearance for a current collector traversing the curve segment.

In order to reinforce the relatively light and flexible body member 54 and relieve it of the effects of any tension in the portion of the trolley wire which is secured to the body member 54, suitable means such as the tension bar 74 may be provided. As shown in Figs. 5 and 7, the tension bar 74 may be connected at one end to the pull-off plate 60, and at the other end to a suitable support plate 76, which may be attached to substantially the midpoint of the body member 54 by welding it thereto. The support plate may be of a dished construction with the end portion on either side of the body member 54 depressed, so that any pull exerted thereon may be substantially in the horizontal plane of the trolley wire.

In order to provide for adjusting the relatively flexible body member 54 to predetermined curvatures to suit different conditions and retaining the predetermined curvatures thereof, suitable means may be provided for varying the effective length of the tension bar 74, so as to vary the distance between the support plate 76 and the pull-off plate 60. For example, the tension bar 74 may be provided with oppositely threaded portions 78 and 80 adjacent the opposite ends thereof which threadedly engage threaded ear portions 82 and 84, respectively, on the pull-off plate 60 and the support plate 76, By rotating the tension bar 74, the body member 54 may be adjusted to assume different predetermined curvatures within a relatively wide range of values.

With a view to increasing the range of adjustability of the relatively flexible body member 54, and maintaining the desired curvature therein, suitable means may be provided for varying the effective length of the tension members 56 and 58. For example, the tension members 56 and 58 which are connected to the pull-off plate 60 by means of the holes 86 in the ends thereof for receiving the clevis pins 88 of the tension members, may be provided with turnbuckles 90 and 92 to vary their effective length.

By adjusting the turnbuckles 90 and 92, together with the adjustable tension bar 74, the radius of curvature of the relatively flexible body member 54 of the curved segment 50, may be varied over a relatively wide range so as to attain the desired curvature. In this manner, a curved segment member of the type herein disclosed may be utilized in the overhead system at any of a number of locations where there are curves of different radii, merely by adjusting the curvature of the member. By thus utilizing one form of curved segment member for covering a relatively wide range of different curvatures in an overhead trolley system the stock of curved segment members required to be maintained may be greatly reduced.

It is to be understood that while only one of the curved segment members of this particular embodiment of the invention has been illustrated and described, a pair of such members may be employed in the same manner as shown in Fig. 1, where two trolley wires are used, such, for example, as in trolley bus systems.

From the above description, and the accompanying drawings, it will be apparent that I have in my invention provided a simple and inexpensive curved construction for overhead trolley systems, which may be readily installed and which provides for continuous support of the trolley wire. The trolley wire is supported so as to maintain a smooth curvature thereof under all operating conditions. Since the trolley wire is positioned so as to be in continuous engagement with the current collector in its passage along the curve, the need for approach members is eliminated and the noise, wear, and other troubles occasioned by the use of such approach members, is thereby obviated, resulting in a longer life of the trolley wire and the current collector and improved operation thereof, in general.

Since certain changes may be made in the above description, and different embodiments of the invention may be made without departing from the spirit thereof, it is intended that all the matter contained in the above description, or shown in the accompanying drawings shall be considered as illustrative, and not in a limiting sense.

I claim as my invention:

1. A curve construction for an overhead trolley system comprising, an elongated curved body member, laterally projecting means maintaining a predetermined curvature of the body member, means for supporting the member in the trolley system, and means comprising a longitudinal groove adjacent the lower edge on the convex side of the body member and cooperative clamp means mounted on the convex side of the body member for continuously supporting a trolley wire along the lower edge of the body member in a lateral curve for a direct engagement by a current collector.

2. A curve construction for an overhead trolley system comprising, an elongated laterally-curved body member having means for supporting the body member in an overhead trolley system, means comprising a groove along the convex side adjacent the lower edge of the body member for receiving and continuously engaging a portion of a trolley wire, and a plurality of spaced clamp means mounted on the convex side of the body member cooperative with the aforesaid means to detachably secure the trolley wire to the body member so as to provide a smooth lateral curve therein for directing a current collector therealong.

3. A trolley conductor supporting device for use with a trolley conductor to form a curve comprising, an elongated body member having a predetermined curvature, means to secure the trolley conductor thereto adjacent the ends in predetermined relation, a strain plate having a portion connected to the body member intermediate its ends and depressed end portions projecting therefrom on opposite sides of the body member with means to receive supporting means, and means connected at one end adjacent and substantially tangent to the ends of the body member with the other ends connected to the projecting portion of the strain plate on the convex side of the body member in substantially the normal horizontal plane of the conductor to maintain the predetermined curvature of the body member.

4. A strain plate for an overhead trolley conductor supporting device having an adjustable curved part adapted to support the conductor comprising, a member having a raised intermediate portion to which the said curved part is adapted to be attached and depressed projecting end portions on opposite sides of said curved part, means associated with one end portion to cooperate with one end of each of a pair of tension members having the other ends connected to said curved part adjacent its ends and permit changing the position of the said one ends relative to the point of attachment of the said intermediate portion to the said curved part whereby to vary the curvature of said curved part.

5. The combination in a curved segment construction for an overhead trolley conductor system, of an elongated laterally curved body member adapted to be secured in the conductor system, said body member having a groove on the convex side adjacent the lower edge thereof, said groove defining a lip portion forming the lower edge of the body member and so shaped as to be positioned in the groove in a trolley conductor, and a plurality of clamp means secured to the body member on the convex side cooperative with the lip portion at spaced intervals to secure the trolley conductor to the lower edge of the body member to provide for direct engagement of the trolley conductor with a current collector.

6. A trolley wire supporting device for use with a trolley wire forming a curve of an overhead system comprising an elongated curved bar of rectangular cross-section, pull-off means positioned on the convex side of the bar intermediate the ends thereof, tension members provided with turnbuckles for adjusting the length thereof connected between the pull-off means and the ends of the bar, and means adjustably connecting the pull-off means to the bar intermediate the ends thereof, including an adjustable tension bar.

7. A support for a trolley wire forming a part of a curve of an overhead trolley system comprising an elongated bar of metal, means securing the trolley wire adjacent the ends of the bar, means to maintain the curvature of the bar when subjected to side strains including a pull-off member positioned on the convex side of the bar, tension members connected adjacent the ends of the bar and to the pull-off member, and means adjustably connecting the pull-off member to the bar adjacent its longitudinal center whereby the curvature of the bar may be varied.

8. A curved segment for supporting a grooved trolley conductor in an overhead trolley conductor system comprising, a flexible body member having a lip portion adjacent the lower edge for engaging the groove in the trolley conductor, means cooperative with the lip portion for securing the trolley conductor along the lower edge of the body member to provide a continuous exposed conductor surface for guiding a current collector, and means secured to the body member for adjusting the curvature thereof.

9. The combination in a curve construction assembly for overhead trolley systems, of an elongated relatively flexible body member, means for securing a trolley wire to the body member to provide a smooth surface for guiding a current collector, a support member connected intermediate the ends of the body members, and means connecting the ends of body member to the support member in substantially the plane of the trolley wire for transmitting the tension of the trolley wire to the support member.

10. A curved segment assembly for an overhead trolley conductor system comprising, a relatively flexible body member having means for securing a trolley wire thereto so as to continuously support the trolley wire and provide for the uninterrupted engagement thereof by a current collector, a laterally extending pull-off member intermediate the ends of the body member for attaching support means to for positioning the segment in an overhead trolley system, and tension members adjustably connecting the body member to the pull-off member to transmit the pull of the trolley wire thereto.

11. An adjustable curve segment for an overhead trolley system comprising as a unit, a laterally flexible body member having means adjacent the lower edge thereof for continuously supporting and aligning a trolley conductor along the outer edge with the current collector engaging surface thereof positioned for uninterrupted engagement with a current collector, a support member, means connecting the body member and the support member for adjusting and maintaining the lateral curvature of the body member, and clamping means for securing the trolley conductor to the body member.

12. A support for a grooved trolley conductor comprising, a laterally flexible body member having an integral lip portion on the lower edge for engaging the groove in the trolley conductor so as to position the conductor with the current collector engaging surface continuously exposed throughout the length of the body member for guiding a current collector, clamp members secured to the body member at spaced intervals for securing the trolley conductor to the body member, a pull-off plate, and adjustable means connected to the body member and the pull-off plate for adjustably flexing the body member to a plurality of different curvatures.

13. A curved construction for supporting a pair of grooved trolley conductors in a curve in an overhead trolley conductor system comprising, a pair of elongated laterally curved body members each having a groove on the convex side adjacent the lower edge for receiving and continuously engaging a portion of one of the trolley conductors and a plurality of clamping means secured to the body member at spaced intervals on the side having the groove for securing the said portion of the trolley conductors therein so as to continuously support and position the trolley conductors in curved paths conforming to the curvature of the curved body members for uninterrupted engagement with a pair of current collectors, insulating members operatively connected to the body members for securing the body members in spaced relation, and transverse pull-off means positioned intermediate the ends of the members for supporting the members in the trolley conductor system.

14. A support for a trolley wire forming a part of a curve of an overhead trolley system comprising an elongated laterally curved bar of metal having a central portion and end portions, means to secure the trolley wire to the bar adjacent the end portions, pull-off means secured to the central portion of the bar and projecting to the convex side thereof, and tension members connected adjacent the end portions of the bar and to the projecting pull-off means, said tension members being provided with turnbuckles to vary the length thereof whereby the curvature of the bar may be varied.

15. A rigid curve unit for use in a continuous trolley conductor system comprising, a laterally flexible curved body member having a predetermined lateral curvature, pull-off means secured to the body member intermediate the ends and projecting transversely thereof on the convex side of the body member, means to secure the conductor in predetermined relation to the body member adjacent the ends thereof, and means extending substantially tangentially from the body member adjacent the ends and secured to the pull-off means adjacent the projecting end to maintain the ends of the body member in predetermined spacial relation to the projecting end of the pull-off means, whereby predetermined curvature of the body member is maintained.

16. A rigid curve assembly for installation in a trolley conductor system as a unit comprising, a laterally flexible body member having means for securing a trolley conductor thereto to provide a smooth surface for guiding a current collector, support plate means connected to the body member intermediate the ends thereof and projecting to the convex side for positioning the curve assembly in the trolley conductor system, and a plurality of substantially rigid tension members connected between the support plate means and the body member adjacent the ends thereof to maintain a predetermined degree of lateral deformation in the body member.

17. A curve assembly for trolley conductor systems comprising, an elongated and laterally flexible body member, means for securing a trolley conductor to the body member, means including laterally projecting portions with depending ears positioned in spaced relation to the body member adjacent the ends thereof, a pull-off plate operatively connected to the body member intermediate the ends, and a plurality of rigid tension members connected between the depending ears and the pull-off plate substantially in the horizontal plane of the trolley conductor to provide a predetermined degree of lateral flexure to the body member.

18. A substantially rigid curve construction for a trolley conductor system comprising, a plurality of relatively flexible elongated body members, means including depending ears positioned in spaced relation to the body members adjacent the ends, means for attaching grooved trolley conductors to the body members, a plate member for connecting a support thereto connected to each of the body members intermediate the ends, means for maintaining the plate members in spatial relation, and a plurality of substantially rigid tension members connected between the said plate members and the depending ears substantially in the horizontal planes of the trolley wires to impart a predetermined degree of curvature to the body members and transmit the tension of the trolley conductors to the said plate members.

19. A rigid curve assembly for a trolley conductor system comprising, an elongated body member, a support member positioned to one side of the body member and connected thereto intermediate the ends, a plurality of adjustable tension members operatively connected between the support member and the ends of the body member to impart a predetermined lateral curvature to the body member, and means for securing a trolley conductor to the body member to provide a smooth path for a current collector.

20. A curve assembly for use in a trolley conductor system comprising, an elongated body member, means including substantially rigid tension members attached to the body member adjacent the ends thereof and extending to laterally projecting pull-off means secured to the body member intermediate the ends thereof cooperative to maintain a predetermined lateral curvature in the body member and transmit the tension of a trolley wire to support means, and means for attaching a trolley wire to the body member to provide a smooth path for a current collector.

21. A trolley wire support for use on a curve in an overhead trolley system comprising, an elongated laterally curved body member, means associated with the bar to secure spaced portions of a trolley wire in predetermined relation to the ends of the member, pull-off means extending laterally of the body member intermediate the ends thereof and on the convex side thereof, means extending substantially tangentially to the pull-off means from adjacent the ends of the member to maintain the ends of the member in predetermined relation to the pull-off means, and means operatively connecting the body member intermediate the ends thereof to the pull-off means in different positions relative to the end of the pull-off means on the convex side of the body member whereby the curvature of the body member may be varied.

22. A trolley wire support for a continuous trolley wire forming a part of a curve in an overhead system comprising, a curved bar of metal having a rectangular cross-section and curved to the same radius of curvature as the wire and adapted to receive and maintain the curvature of the wire, means at each end of the bar to hold the trolley wire in a predetermined relation to the bar, elongated strain plate means positioned transversely of the bar and attached thereto adjacent its longitudinal center, means adjacent the ends of the plate means to receive supporting means for the device, tension rods each having one end associated with the bar on opposite sides of the plate means and spaced from the plate means and from the ends of the bar, means secured to the bar and to which the said ends of the rods are secured, the said means forming a channel with the bar for the passage of a current collector flange and holding the rod ends in substantial transverse alignment with the lower edge of the bar, and means associated with the plate to receive the free ends of the rods whereby the said ends may be attached to the plate means and the bar held to a predetermined curvature.

23. A trolley wire support for use on a curve in an overhead system comprising, a curved bar of metal yieldable in the direction of its curvature whereby the radius of its curvature may be varied as required, means at each end of the bar to hold the trolley wire in predetermined relation to the bar, strain plate means attached to the bar in transverse relation thereto, tension rods to hold the curvature of the bar to a predetermined radius, means secured to the bar adjacent its free ends, each said last named means comprising an elongated member attached to the upper portion of the bar and having a depending portion spaced from the bar and forming a channel therewith through which a flange on a current collector may pass, one end of each tension rod being secured to the lower longitudinal edge of the said depending portion and in substantially horizontal alignment with the said lower edge of the bar and also with those portions of the trolley wire projecting therefrom whereby the tension rods operate substantially as though in axial alignment with the trolley wire without interfering with the passage of the current collector the free ends of the rods extending to the strain plate means and means on the strain plate means by which the said ends of the rods may be secured to the plate means.

24. A trolley wire support for use on a curve in an overhead trolley system comprising, an elongated curved bar of metal the bar also being yieldable in the direction of its curvature whereby the radius of its curvature may be varied as required, means at each end of the bar to hold the trolley wire in predetermined relation to the bar, strain plate means attached to the bar in transverse relation thereto and projecting in opposite directions from the bar, tension rods to hold the curvature of the bar to a predetermined radius, means secured to the end portions of the bar, each said last named means comprising a member secured to the upper portion of the bar and having a depending portion spaced from the bar and forming a channel through which a flange on a current collector may pass, one end of each tension rod being secured to one of the depending portions of the last said means whereby the tension rods operate substantially as though in axial alignment with the trolley wire without interfering with the passage of the current collector, the free ends of the rods extending to the strain plate means and means on the strain plate means by which the said ends of the rods may be secured to the plate means.

25. A trolley wire support for use on a curve in an overhead trolley system comprising, an elongated bendable bar of metal curved to a predetermined radius, means associated with the bar to hold a trolley wire in predetermined relation thereto, a plate of metal attached to the bar adjacent its longitudinal center, means for adjusting the radius of curvature of the bar associated with the ends of the bar and movably associated with the plate whereby the curvature of the bar may be either increased or decreased without altering the attachment of the bar to the plate and means to detachably secure the said means to the plate to maintain said curvature.

26. A device to support a pair of continuous trolley wires on a curve in an overhead trolley system comprising, a pair of supports held in parallel and spaced relation, each support comprising an elongated curved bar of metal bendable in the direction of curvature, means connecting the ends of the bar in tangential relation to angularly related portions of one of the trolley wires, transversely disposed plate means associated with the bar intermediate its ends and projecting laterally to the convex side of the bar, means on the plate means by which attachments may be made to the plate means for positioning it, means extending substantially tangentially from adjacent the ends of the bar and attached to the plate means to maintain the ends of the bar in predetermined spacial relation to the plate means, means adjustably securing the bar intermediate the ends thereof to the plate means at different distances from the attachment of the aforesaid means to the plate means whereby the curvature of the bar may be varied and maintained, and insulating means operatively connecting said plate means of the two supports whereby the supports are held in spaced, parallel and insulated relation.

27. In combination, strain plate means with means at the ends to receive supporting means for the plate means, a curved bar with means thereon to attach the bar to the plate means intermediate its ends, a continuous trolley wire positioned along the convex side of the bar and projecting away from each end of the bar, means at each end of the bar to receive the trolley wire and hold it in predetermined relation to the bar and elongated means attached to the bar on each side of the plate means and spaced therefrom and also attached to the plate means to maintain the curvature of the bar, the axis of each elongated means being substantially in alignment with the axis of the projecting portion of the trolley wire nearest the elongated means.

28. A device to support a trolley wire forming part of an overhead system comprising an elongated bar of bendable metal formed to a predetermined curvature, a transverse support member secured to the bar adjacent its longitudinal center, elongated means, the said means having ends associated with the bar at points on opposite end portions of the bar and spaced from the transverse support member and the other ends of the elongated means being associated with the transverse member at points equally spaced from the bar at adjustable distances therefrom whereby the curvature of the bar subtended by the said means may be either increased or decreased and the curvature of the bar after adjustment maintained against side strains in service and means associated with the bar to secure the trolley wire to the bar.

29. A trolley conductor support comprising, an elongated laterally curvable metal body member, means associated with the body member to position the trolley conductor in predetermined relation to said body member, laterally projecting means attached to the body member intermediate its ends, tension members secured at one end adjacent opposite ends of the body member and extending toward the projecting means, and attaching means adjustable to connect the other ends of the tension members to the projecting means in a plurality of positions whereby the curvature of the body member may be varied without changing the length of the tension members.

30. A curve construction for use with a trolley conductor comprising, an elongated laterally curvable body member, means secured to the body member to position the trolley conductor in predetermined relation relative thereto, tension members extending toward each other from adjacent the ends of the body member in substantially tangential relation to said ends, and connecting means connecting the adjacent ends of the tension members to the body member intermediate its ends operable to position the adjacent ends of the tension members in different positions relative to the intermediate portion of the body member to vary the curvature of the body member.

31. A trolley conductor support comprising, an elongated laterally flexible curved metal bar, means to secure the trolley conductor in predetermined relation to the bar, means secured adjacent the ends of the bar having upper portions extending to the outer side of the bar with depending ears, tension members connected to the depending ears in substantially the normal horizontal plane of the trolley conductor and extending toward each other in substantially tangential relation to the ends of the bar, and means connecting the adjacent ends of the tension members to the bar intermediate its ends adjustable to vary the positions of the adjacent ends of the tension members relative to the intermediate portion of the bar so as to vary the curvature of the bar and maintain a predetermined curvature therein.

ADOLPH G. DENBIN.